INVENTOR.
FRANK W. BUBB

July 19, 1955 F. W. BUBB 2,713,457
COMPUTER
Filed June 9, 1950 2 Sheets-Sheet 2

INVENTOR.
FRANK W. BUBB
BY Hudson & Young
ATTORNEYS

United States Patent Office 2,713,457
Patented July 19, 1955

2,713,457
COMPUTER

Frank W. Bubb, Webster Groves, Mo., assignor to Phillips Petroleum Company, a corporation of Delaware Application June 9, 1950, Serial No. 167,129

15 Claims. (Cl. 235—61)

This invention relates to computers. In one specific aspect thereof, it relates to vapor-liquid equilibrium computers. In another specific aspect thereof, it relates to electrical circuits for carrying out the computer operations.

In many practical operations in refining, chemical, and other industries, it is of very great importance to determine the composition and amount of liquid and vapor phases in a vapor-liquid equilibrium mixture. In general, the overall composition and total quantity of the mixture are known, from which data the total number of mols in the mixture and the total mol fraction of each component in the mixture may be readily calculated. Furthermore, the equilibrium constant for each component for the particular temperature and pressure involved are either known or may be calculated readily from known data. The computer of this invention, upon being supplied the equilibrium constant of each component at the temperature and pressure involved, the total mol fraction of each component in the mixture, and the total number of mols in the mixture, calculates the mol fraction of each component in the liquid phase, the mol fraction of each component in the vapor phase, and the total number of mols of the mixture in the vapor phase or in the liquid phase. Once the mol fractions are known, the parts by weight or percentage of each component in the gas and liquid phases may be easily determined, if it is necessary to do so.

The computer circuits described herein, however, are not restricted to the solution of the vapor-liquid equilibrium problem but may be utilized directly to solve many equations of similar form. Moreover, certain improved features of my computer are applicable to computers solving diversified problems not closely related to the solution of the vapor-liquid equilibrium problem.

It is an object of the invention to provide an improved computer suitable for solving the vapor-liquid equilibrium problem.

It is a further object to provide electrical computing circuits applicable both to the vapor-liquid equilibrium problem and to other diversified problems in the computer art.

It is a still further object to provide apparatus which is rapid and reliable in operation, of rugged construction, and which utilizes a minimum number of circuit components.

Various other objects, advantages and features of the invention will become apparent from the following detailed description taken in conjunction with the accompanying drawings, in which.

Figure 1:
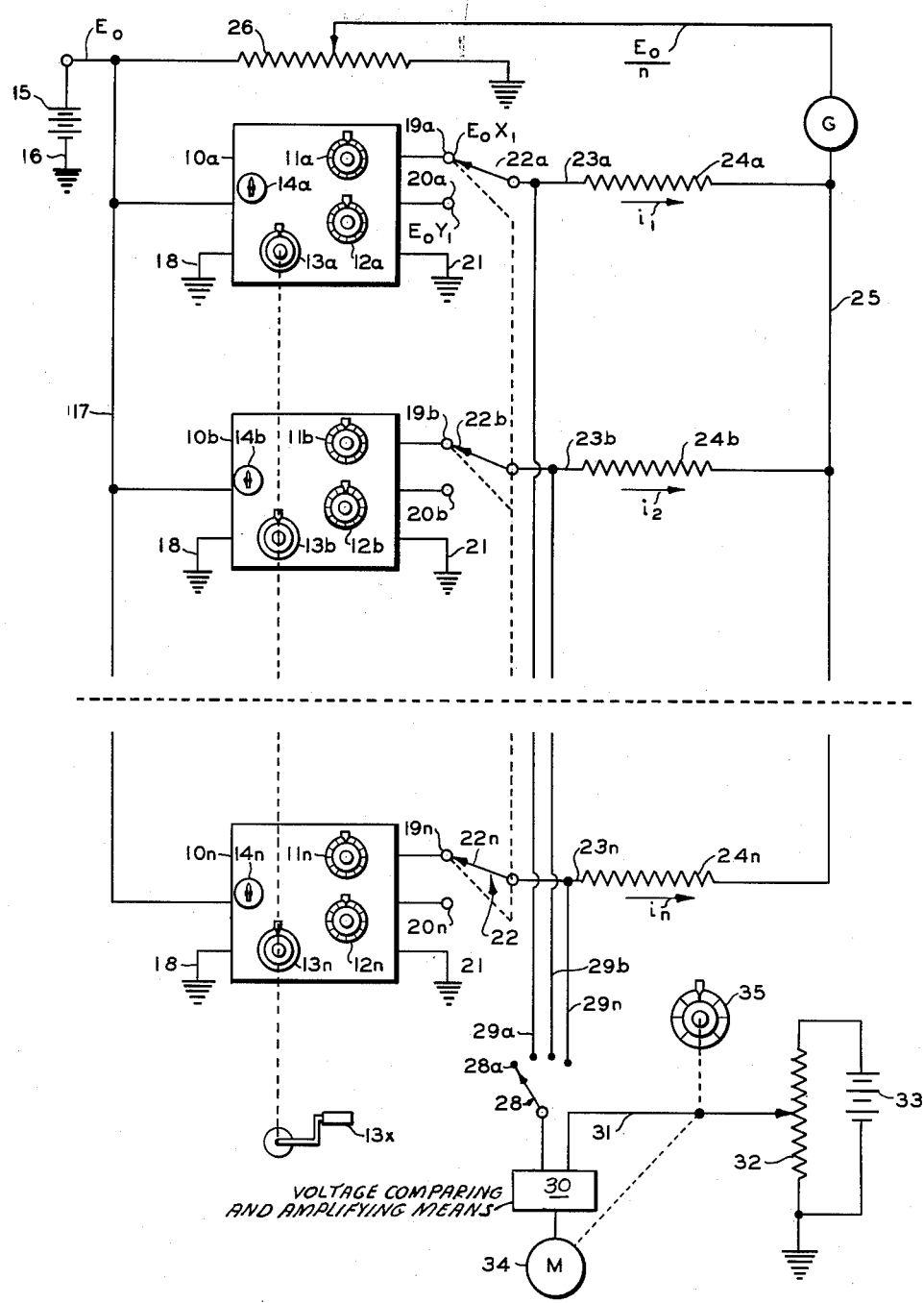
Figure 1 is a block diagram of the computer assembly.

In a vapor-liquid mixture containing several components, each component does not behave independently of the other components as regards its distribution between the gas and liquid phases. In particular, the following relationships hold for each component in the vapor-liquid mixture:

$$x_1 = \frac{Z_1}{1 + v(K_1 - 1)} \tag{1}$$

$$y_1 = \frac{K_1 Z_1}{1 + v(K_1 - 1)} \tag{2}$$

where $x_1$ represents the mol fraction of a component in the liquid phase, $y_1$ represents the mol fraction of said component in the vapor phase, $v$ is the total mol fraction of vapor in the entire mixture, $Z_1$ is the total mol fraction of the component in the entire mixture, and $K_1$ is the equilibrium constant of the component at the temperature and pressure under consideration. Evidently, for a mixture containing several components, the sum of the mol fractions in the liquid phase is 1 and, similarly, the sum of the mol fractions in the vapor phase is 1. That is, $$x_1 + x_2 + \ldots + x_n = 1 \tag{3}$$

and $$y_1 + y_2 + \ldots + y_n = 1 \tag{4}$$

where there are $n$ components in the mixture.

In carrying out my invention a plurality of computer units $10a$, $10b$, ... $10n$, are provided, one for each component in the mixture. The total mol fractions $Z_1$, $Z_2$, ..., $Z_n$ of the respective components are set upon dials $11a$, $11b$, ... $11n$, the mol fraction of the first component being set on dial $11a$, the mol fraction of the second component being set on dial $11b$, and the mol fractions of the remaining components being set, respectively, on dials $11c$ to $11n$, respectively. In similar fashion, the equilibrium constants $K_1$, $K_2$, ..., $K_n$ are set upon dials $12a$, $12b$, ..., $12n$, the constant for the first component being set upon dial $12a$, the constant for the second component being set upon the dial $12b$, and the constants for the remaining components being set upon dials $12c$ to $12n$, inclusive. The computer units 10 are also provided with dials $13a$, $13b$, ..., $13n$ which are ganged and movable as a unit by a crank $13x$, the setting of these dials being representative of the total mol fraction of vapor in the mixture. Finally, the computer units are provided with reversing switches $14a$, $14b$, ..., $14n$, the function of which will be explained hereafter.

A constant voltage is supplied to each computer unit 10 by a battery or other voltage source 15, one terminal of the battery being grounded at 16 and the other terminal of the battery being connected by a common conductor 17 to the respective computer units 10, the battery circuit being completed for each computer unit by a ground lead 18.

In a preferred embodiment of the invention, the computer unit produces outputs at terminals $19a$, $19b$, ..., $19n$ equal to the product of the battery voltage $E_0$ and the mol fraction of the component under consideration in the liquid phase. Thus, for example, the voltage at terminal $19a$ may be represented by $E_0 x_1$, and the voltage at terminal $19n$ may be represented by $E_0 x_n$. Each such output voltage represents the relationship shown in Equation 1 between the variables determining the mol fraction of the component in the liquid phase, this result being accomplished by the circuits shown in Figures 2 and 3, which will be hereinafter described in detail. Moreover, the computer units 10 produce voltages at output terminals $20a$, $20b$, ..., $20n$, respectively, which are equal to the product of the battery voltage and the mol fraction of the respective components in the vapor phase. Thus, for example, the voltage at terminal $20a$ may be represented by $E_0y_1$, and the voltage at terminal $20n$ may be represented by $E_0y_n$. It will be understood that these voltages are taken with reference to a ground connection, as indicated at 21.

A multi-gang switch 22 is provided to selectively connect terminals 19 and 20 to the respective leads 23a, 23b, ..., 23n, these leads being connected through resistances 24a, 24b, ..., 24n, respectively, to a common conductor 25. The resistances 24 are all of equal ohmic value, and this ohmic value is substantially higher than that of the circuits making up the computer units 10. When I speak of these resistances as having a high ohmic value, I mean sufficiently high that the current flow therethrough is negligible so that this current does not disturb the voltages existing at various points within the computer units, within prescribed limits of accuracy. The common conductor 25 is connected through a galvanometer G to the contactor of a potentiometer 26, one fixed terminal of which is grounded, and the other fixed terminal of which is connected to the ungrounded side of battery 15.

In the operation of the circuit of Figure 1, potentiometer 26 is adjusted so that a voltage $$\frac{E_0}{n}$$

is impressed upon the galvanometer G. Thereupon crank 13x is adjusted until a null reading is obtained upon the galvanometer. It will be understood that the described adjustment of crank 13x changes the value of $v$ in each of the computer units, the settings representing K and Z being unchanged by this adjustment. When a zero reading of the galvanometer is obtained, as described, the conductor 25 is at the potential $$\frac{E_0}{n}$$

When the circuit is balanced, the voltage drop across resistor 24a is $$E_0 x_1 - \frac{E_0}{n}$$

which equals $i_1 r$, the product of the current $i_1$ through the resistor and its resistance $r$.

Adding these relationships for each resistor 24, it is evident that $$E_0(x_1 + x_2 + \ldots + x_n) - \frac{nE_0}{n} = r(i_1 + i_2 + \ldots + i_n)$$

Since the circuit is balanced, the sum of the currents $(i_1 + i_2 + \ldots + i_n)$ equals zero with the result that $(x_1 + x_2 + \ldots + x_n) = 1$. That is, when the crank 13x is turned to the proper value of $v$, the circuit is balanced and the sum of the mol fractions of the various components in the liquid phase is equal to unity. Accordingly, the value of $v$ satisfies Equation 3, and the potentials $E_0 x$ correctly represent the mol fractions of the respective components in the liquid phase. Similarly, when switch 22 is moved into engagement with terminals 20 and crank 13x is adjusted until the circuit is balanced, the same value of $v$ is found to satisfy Equation 4 and the potentials $E_0 y$ correctly represent the mol fractions of the components in the vapor phase.

Assuming that the circuit has been balanced with the switch 22 in its upper position, the value $v$ is read from any one of the dials 13. I also provide a servomechanism unit for reading the values of $x_1, x_2, \ldots, x_n$. This unit includes a switch 28 having an unconnected contact point 28a and having other contact points connected to the leads 23 by conductors 29a, 29b, ..., 29n, respectively. The arm of switch 28 is connected to the input circuit of a voltage comparing and amplifying means 30, this input circuit also being connected by a lead 31 to the contactor of a potentiometer 32, the fixed terminals of which are connected to a battery 33. Voltage comparing means 30 can be of the form shown in Electronic Control Handbook, Batcher and Moulic, page 298, for example. Terminals A, A of Figure 13-V of this reference correspond to terminals 28 and 31 of Figure 1. A motor 34 driven by the output of means 30 is mechanically coupled to the arm of potentiometer 32 and causes movement of this arm to a position where the voltage at conductor 31 equals the voltage at the arm of switch 28. The motor is also mechanically coupled to a dial 35 and, when the input voltage to means 30 is zero, the motor is stopped, and the dial indicates a fraction equal to the voltage applied to the arm of switch 28 divided by the battery voltage $E_0$. Accordingly, as the switch arm is moved successively to its contact points, the values of the mol fractions $x_1, x_2, \ldots, x_n$ are read upon dial 35. Similarly, when switch 22 is in its lower position, the values of mol fractions $y_1, y_2, \ldots, y_n$ are read upon dial 35 as the arm of switch 28 is moved successively to the different contact points.

In the overall operation of the computer, therefore, the values of K for the respective components of the mixture are set upon the dials 12 and the total mol fractions of the respective components are set upon the dials 11. If it is desired to determine the mol fractions of the various components in the liquid phase, switch 22 is moved to its upper position and the circuit is balanced by adjustment of crank 13x until galvanometer C reads zero. Thereupon, the correct value of $v$ is read upon any of the dials 13 and the values $x$ of the mol fractions of the components in the liquid phase are read by moving switch 28 to its several positions and observing the readings upon dial 35. Thereupon, if desired, switch 22 may be moved to its lower position, and crank 13x adjusted until a null reading is obtained upon the galvanometer. The value of $v$ upon the dials 13 should then agree with the value previously obtained with switch 22 in its upper position. Thereupon, the values of the mol fractions of the components in the vapor phase are read upon dial 35 by moving switch 28 successively to its different positions. Of course, the values of $y_1, y_2, \ldots, y_n$ may be obtained simply by multiplying the values of $x_1, x_2, \ldots, x_n$ by the equilibrium constants $K_1, K_2, \ldots, K_n$, respectively. Thus, the second balancing operation is useful primarily as a check upon the accuracy with which the coefficients were set into the computer.

Figure 2:
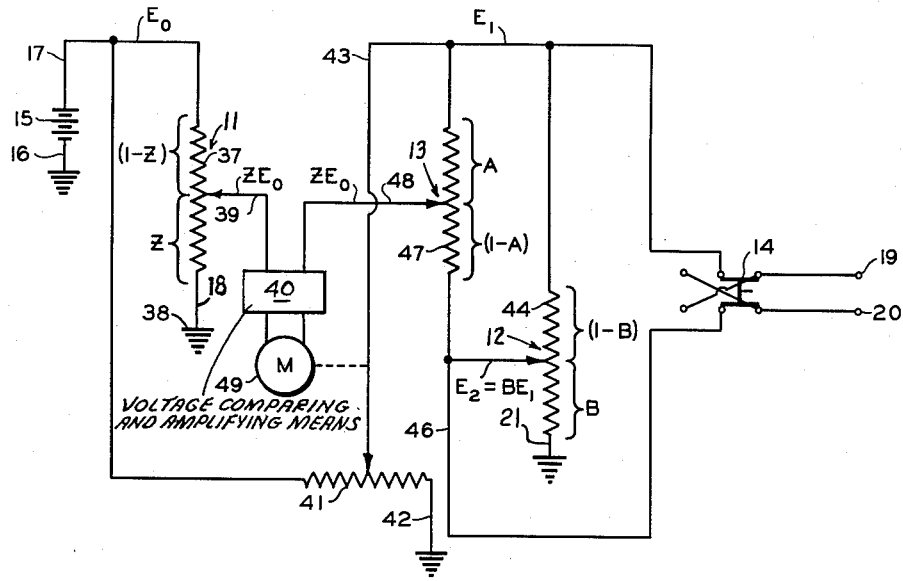
Figure 2 is a schematic circuit diagram of one of the computing units of Figure 1.

In Figure 2, I have shown a circuit suitable for use as any of the computer units 10 where neither the equilibrium constant nor total mol fraction of liquid or vapor has an abnormal value. In this figure, parts similar to those described in Figure 1 are indicated by like reference characters. It will be noted that the voltage $E_0$ of battery 15 is applied to one fixed terminal of a potentiometer 37 controlled by a dial 11, Figure 1, the other fixed terminal of the potentiometer being grounded at 18. The contactor of potentiometer 37 is connected by a lead 39 to an input circuit of a voltage comparing and amplifying means 40 which corresponds to means 30 of Figure 1. For purposes of explanation, the potentiometer settings are indicated on the figure as fractions, Z representing the fraction of the total potentiometer resistance between the contactor and ground while $(1-Z)$ represents the fraction of the total resistance connected between the contactor and the upper fixed terminal of the potentiometer. Thus, if Z equals one-third, the contactor is positioned one-third of the way up from the grounded terminal of the potentiometer. The legends applied to other potentiometers in the circuit indicate fractions of the total potentiometer resistance in a manner similar to that already described.

It will be evident, therefore, that the voltage at conductor 39 is Z times the total voltage $E_0$ impressed across the potentiometer, that is, $ZE_0$.

Conductor 17 also extends to one fixed terminal of a potentiometer 41, the other fixed terminal of which is grounded at 42. The contactor of potentiometer 41 is connected by a lead 43 to one terminal of reversing switch 14. Conductor 43 also extends to one fixed terminal of a potentiometer 44 controlled by a dial 12, Figure 1, the other fixed terminal of the potentiometer being grounded at 21. The contactor of potentiometer 44 is connected to a lead 46 which extends to another terminal of reversing switch 14 and to one fixed terminal of a potentiometer 47 controlled by a dial 13, Figure 1, the other fixed terminal of the potentiometer being connected to lead 43. The other terminals of reversing switch 14 extend to output terminals 19 and 20. The contactor of potentiometer 47 is connected by a lead 48 to an input circuit of means 40 and the output of amplifier 40 drives a servomotor 49 which is mechanically connected to the contactor of potentiometer 41.

The arrangement of the described servomechanism including means 40 and motor 49 is such that the motor moves the contactor of potentiometer 41, thereby varying the voltage impressed upon the network consisting of potentiometers 44, 47 until the voltage impressed upon conductor 48 is equal to the voltage impressed upon conductor 39. This is accomplished by connecting leads 39, 48 in such fashion as to cause opposition of the voltages carried by these leads, thereby producing a resultant voltage which is amplified by unit 40 and drives motor 49 in the proper direction to decrease the resultant voltage. When this resultant voltage becomes zero, the voltage at conductor 48 is equal to $ZE_0$, movement of the motor is stopped, and the circuit is balanced.

In accordance with the invention, the resistance of potentiometer 47 is substantially higher than the resistance of potentiometer 44. When I say, in the appended claims, that the potentiometer 44 is of low resistance and the potentiometer 47 is of high resistance, I mean that the resistance of potentiometer 47 is sufficiently high that the current flowing therethrough has a negligible effect upon the voltage at the contactor of potentiometer 44. This result may be accomplished, to any desired degree of accuracy, by proper selection of the ohmic values of potentiometers 44 and 47. Accordingly, the voltage $E_2$ equals $BE_1$. The voltage $ZE_0$ at the contactor of potentiometer 47 is, therefore, equal to $ABE_1+(1-A)E_1$. That is, $$E_1 = \frac{ZE_0}{1-A+AB} \quad (5)$$

$$E_2 = BE_1 = \frac{BZE_0}{1-A+AB} \quad (6)$$

The mol fractions $v$ and $Z$ necessarily lie between zero and one. Hence, there is ordinarily no difficulty in setting these fractions upon the proper potentiometer. However, the equilibrium constant $K$ may vary from a small fraction to a very large number. When $K$ lies between zero and one, it is set as $B$ upon the potentiometer 44 while the mol fraction $v$ is represented by $A$. Thus, substituting $A=v$, $B=K$ in Equations 5 and 6 gives $$E_1 = \frac{ZE_0}{1+v(K-1)} = E_0 x_1 \quad (7)$$

$$E_2 = \frac{KZE_0}{1+v(K-1)} = E_0 y_1 \quad (8)$$

These output voltages appear at the terminals 19 and 20, respectively, and they are the same as set forth in connection with Figure 1 so that the computer unit of Figure 2 functions in the manner already described as any of the computer units 10 in Figure 1, provided, however, that the value of $K$ for any such unit is within the range of zero to one.

Where the value of $K$ for a particular component is greater than one, the potentiometer 44 is set to the value $$B = \frac{1}{K}$$

and the setting of potentiometer 47 represents the value $A = 1-v$. Substituting these values in Equations 5 and 6 yields $$E_1 = \frac{KZE_0}{1+v(K-1)} = E_0 y_1 \quad (9)$$

$$E_2 = \frac{ZE_0}{1+v(K-1)} = E_0 x_1 \quad (10)$$

It will be noted that this circuit operates in precisely the same manner as already described except that the potential $y_1 E_0$ appears as voltage $E_1$ instead of voltage $E_2$ while the potential $x_1 E_0$ appears as voltage $E_2$ instead of as voltage $E_1$. Where one or more components has a value of $K$ greater than one, reversing switch 14 is actuated in the one or more corresponding units 10 so that the voltage $E_0 x_1$ appears at terminal 19 and the voltage $E_0 y_1$ appears at terminal 20, as described in connection with Figure 1. This reversing switch should also incorporate a unit for reversing the connections to the fixed contacts of potentiometer 47 which unit is not shown on the drawing for purposes of simplicity. In this connection, it will be noted that all the potentiometers 47 of the several computer units are ganged and operated by crank $13x$ together with dials 13. However, $A$ represents $v$ where the equilibrium constant is less than one whereas $A$ represents $(1-v)$ where the equilibrium constant is greater than one. When the connections to the fixed contacts of potentiometer 47 are reversed in the case of an equilibrium constant greater than one, the "V" scale of the potentiometer of this unit is consistent with the "V" scale of the other potentiometers.

As previously explained, the dials 13, which control the potentiometers 47 of the respective computer units, are moved in unison when the circuit of Figure 1 is balanced. Such movement of potentiometer 47, Figure 2, produces a continuous and automatic rebalancing of the circuit of Figure 2 in accordance with the movement of crank $13x$. The speed of operation of amplifier 40 and motor 49 is such that there is no discernible lag between the movement of dials 13 and the subsequent rebalancing of the computer unit circuits.

When the circuit of Figure 2 is balanced, it will be noted that a voltage from potentiometer 41 is supplied to the network including potentiometers 44 and 47 across potentiometer 44. The function of potentiometer 47 is to pick off a preselected proportion of the voltage existing between the contactor of potentiometer 44 and a point 43 whose voltage is derived from potentiometer 41, the voltage thus picked up being compared with a reference voltage developed across potentiometer 37 to produce a voltage difference which, through the medium of amplifier 40 and motor 49, adjusts the voltage supplied to the potentiometer network 44, 47 until the voltage difference between leads 39 and 48 is eliminated. It will be evident to those skilled in the art that this principle of operation is applicable to various types of computers, other than a vapor-liquid equilibrium computer.

The computer unit of Figure 2 is sufficient for the great majority of components found in the usual equilibrium mixture of vapor and liquid. However, there are some special cases where the computer unit of Figure 2 is somewhat insensitive. For example, if the equilibrium constant of a particular component approaches zero and the total mol fraction of the mixture in the vapor phase approaches one, the denominator of the vapor equilibrium equation approaches zero and the circuits are somewhat insensitive. This corresponds physically to a mixture where one component is practically involatile and nearly all the remainder of the mixture is in the vapor phase. In accordance with my invention, the computer unit for any such component is made more sensitive in the region of interest in the manner illustrated by Figure 3.

In this figure, conductor 17 is connected to one fixed terminal of a potentiometer 52, the other fixed terminal of which is grounded at 18, the contactor of potentiometer 52 being connected by a lead 54 to amplifier 40, motor 49, and potentiometer 41 in the manner described in connection with Figure 2. A potentiometer 55 has one fixed terminal grounded and its other fixed terminal connected to conductor 43, the contactor of potentiometer 55 being connected by a lead 56 to one fixed terminal of a potentiometer 57, the other fixed terminal of which is connected to a lead 58. The contactor of potentiometer 57 is connected by a lead 59 to the input circuit of means 40. A potentiometer 60 has one fixed terminal connected to conductor 43 and its other fixed terminal grounded at 19, the contactor of the potentiometer being connected through a lead 61 and a fixed resistance 62 to the lead 58. A fixed resistance 63 is connected between conductors 43 and 58.

The potentiometer 52 is set to represent $$\frac{fZ}{2}$$

so that the voltage at lead 54 is $$\frac{fZE_0}{2}$$

where $f$ represents a scale factor for increasing the sensitivity of the potentiometers. Means 40 and motor 49 operate, in conjunction with potentiometer 41, in the manner described in connection with Figure 2 so as to vary the voltage at conductor 43 until the voltage at conductor 59 is equal to $$\frac{fZE_0}{2}$$

the same as the voltage at lead 54. The ohmic value of potentiometer 57 and fixed resistors 62, 63 is high as compared with the ohmic value of potentiometers 55 and 60 with the result that the small current flow through the first-mentioned resistors has a negligible effect upon the voltages at conductors 56 and 61. Accordingly, the voltage at conductor 61 is $MV_1$, where $V_1$ is the voltage at conductor 43, while the voltage at conductor 56 is $DV_1$. Preferably, fixed resistance 62 has one-half the ohmic value of potentiometer 57 while resistance 63 has one-third the ohmic value of potentiometer 57. Furthermore, assuming that the voltage at conductor 58 is $V_2$, the current $$\frac{(DV_1-V_2)}{R}$$

through potentiometer 57 plus the current $$\frac{(V_1-V_2)}{R/3}$$

through resistor 63 equals the current $$\frac{(V_2-MV_1)}{R/2}$$

through resistance 62. Thus, $$V_1(3+D+2M)=6V_2 \qquad (11)$$

Furthermore, the voltage $V_3$ at the contactor of potentiometer 57 may be represented by the following equation:

$$V_3=CV_2+(1-C)DV_1 \qquad (12)$$

Solving Equations 11 and 12 for $V_1$ yields the following expression:

$$V_1=\frac{6V_3}{3C+6D-5CD+2MC} \qquad (13)$$

In this circuit, potentiometer 57 is set so that $C=f(1-v)$. As stated, $v$ is approximately equal to one so that the small difference between $v$ and one is multiplied by the factor $f$, which may be 10, 100 or 1,000, thus making it possible to set this number with much greater ease and accuracy upon potentiometer 57. Potentiometer 55 is set so that $$D=\frac{fK}{2}$$

so that K which is, as stated, closely equal to zero, is multiplied by the factor $$\frac{f}{2}$$

thus making it much easier to set upon potentiometer 55. Potentiometer 60 is set so that $M=(1.25f-1.5)K$ and $V_3$, of course, is equal to $$\frac{fZE_0}{2}$$

Substituting these values in Equation 13, we have $$V_1=\frac{ZE_0}{1+V(K-1)}=x_1E_0 \qquad (14)$$

Figure 3:
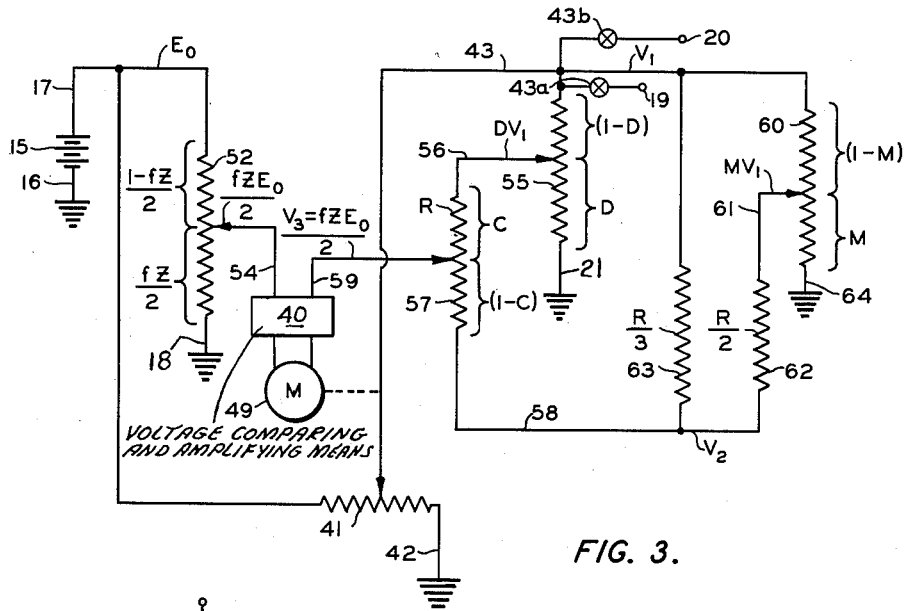
Figure 3 is a schematic circuit diagram of a modified computer unit suitable for use in the apparatus of Figure 1.

This voltage is applied through a switch 43a to a terminal 19 of Figure 1, and the unit of Figure 3 is used for each component having a value of K close to zero where the value of $v$ is close to one. Thus, the circuit permits the described values of $v$ and K to be set with a much higher degree of accuracy while still producing the same output at terminal 19 as the unit of Figure 2. It will be noted that there is no point upon the network of Figure 3 where the potential is equal to $y_1E_0$. Thus, when one or more of the units of Figure 3 is utilized in the computer of Figure 1, the values of $y$, the mol fraction in the vapor phase of the various components, cannot be read from the computer. However, these values may be readily obtained merely by multiplying each value of $x$, for example $x_1$, by its corresponding value of K, for example $K_1$.

It will be further noted, in connection with Figure 3, that the setting C of potentiometer 57 corresponding, by proper choice of the direction of shaft rotation, to the setting $A=v$ of potentiometer 47 of Figure 2 is $fv$. This would prevent proper joint adjustment of the potentiometers of the several computer units by the crank 13x since the potentiometer 57 would have to be rotated $f$ times as fast as potentiometer 47 of Figure 2 to produce a corresponding change in the fraction represented thereby. This difficulty may be overcome by gearing the potentiometers 47 to the crank in such fashion that the contactor movement is $f$ times as fast as contactor movement of the potentiometers 57 of the computer units of Figure 3. Alternatively, the same result may be accomplished electrically by substituting the circuit of Figure 4 for the potentiometer 47 of Figure 2. This circuit includes a potentiometer 65 of the same ohmic value as the potentiometer 47 in Figure 2. Assuming that the resistance of this potentiometer is R, it is shunted by a fixed resistance 66 having an ohmic value of $$\frac{R}{f-1}$$

these shunted resistances being connected in series with a fixed resistance 67 having an ohmic value of $$\frac{(f-1)R}{f}$$

The total resistance of this combination is R but the resistance between the contactor of potentiometer 65 and the lower end of resistor 67 varies from $$\frac{(f-1)R}{f} \text{ to } R$$

Thus, if $f$ equals 10, for example, the full scale movement of potentiometer 65 produces a resistance variation from .9R to R. The spread of the potentiometer over the upper tenth of its range is multiplied by ten and the potentiometer must be moved ten times as fast as before to produce a corresponding change in resistance. In general, where the resistances have the values stated, full scale movement of the potentiometer arm produces a change in resistance of $$\frac{R}{f}$$

Figure 4:
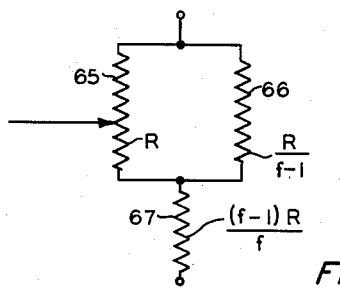
Figure 4 is a schematic circuit diagram of a circuit for increasing the spread of a potentiometer over a preselected part of its range.

Accordingly, when the circuit of Figure 4 is substituted for the potentiometer 47 of Figure 2, movement of crank 13x produces equal changes in the magnitude of $v$ in the Figure 2 units and the Figure 3 units so that the overall operation of the circuit of Figure 1 is unchanged. The above relationship, of course, only holds when a negligible current is drawn from the contactor of the potentiometer.

The function of the resistances 60, 62 and 63 in the described circuit is to provide a voltage at conductor 58 equal to $$\frac{V_1}{2}(1+fK-K)$$

When this voltage is provided, it will be seen that the circuit functions in a manner analogous of that of Figure 2. That is, a preselected fraction of a voltage existing between the contactor of potentiometer 55 and a preselected point 58 connected in circuit with the voltage supply conductor 43 by potentiometer 60 and resistances 62, 63 is compared at the means 40 with a reference voltage derived from potentiometer 52 to produce a resultant voltage, the servomechanism including amplifier 40 and motor 49 adjusting the voltage supply from potentiometer 41 to the resistance network until the resultant voltage across means 40 becomes zero. The voltage $$\frac{V_1}{2}(1+fK-K)$$

may be derived from other circuits without departing from the spirit and scope of the invention. Furthermore, the values of resistors 62, 63 may be varied and the circuit will still produce the desired voltage at conductor 58, although the setting of the potentiometer at M will, in general, be more complicated.

The circuit of Figure 3 is also effective to increase the sensitivity of a computer unit where the equilibrium constant of the component under consideration becomes very large and $v$, the mol fraction of vapor in the entire mixture, approaches zero, corresponding physically to the case where the component under consideration is extremely volatile but most of the mixture is the liquid phase. In this case, potentiometer 57 is set so that $C=fv$. Since $v$ is closely equal to zero, its value is multiplied by the factor $f$ thus making it much easier to set this particular value upon the potentiometer. Potentiometer 55 is set so that $$D=\frac{f}{2K}$$

Since K is very large, $$\frac{1}{K}$$

is a small fraction which is multiplied by the factor $$\frac{f}{2}$$

thus making this small fraction much easier to set upon the potentiometer. Potentiometer 60 is set so that $$M=\frac{(1.25f-1.5)}{K}$$

Substituting these values in Equation 13 gives $$V_1=\frac{KZE_0}{1+V(K-1)}=y_1E_0 \quad (15)$$

In this case, the voltage at lead 43 is representative of the percentage of the components in the vapor phase, rather than in the liquid phase. Accordingly, the voltage is applied to a terminal 20 of Figure 1 by a switch 43b. When this circuit is used, there is no point on the circuit corresponding to the value of $x_1$ so that the value of $x_1$ cannot be read from the ordinary circuits of the computer. In this case, the value of $x_1$ is obtained merely by dividing the value of $y_1$ by $K_1$. It will be noted that in this case, also, it is necessary to spread the settings of the potentiometer 47 of the Figure 2 units, so that all the potentiometers 47, 57 may be jointly actuated by crank 13x. This may be done mechanically or by substituting for each of the potentiometers 47 a unit similar to that of Figure 4 except that resistance 67 is positioned at the top rather than at the bottom of the shunted components 65, 66. Thus, the spreading occurs over the lower part of the potentiometer range, rather than over the upper part, as in Figure 4.

The function of the resistances 60, 62 and 63 in the last described unit is to provide a voltage at conductor 58 equal to $$\frac{V_1}{2}\left(1+\frac{f}{K}+\frac{1}{K}\right)$$

When this voltage is provided, it will be seen that the circuit functions in a manner analogous of that of Figure 2. That is, a preselected fraction of a voltage existing between the contactor of potentiometer 55 and a preselected point 58 connected in circuit with the voltage supply conductor 43 by potentiometer 60 and resistances 62, 63 is compared at the means 40 with a reference voltage derived from potentiometer 52 to produce a resultant voltage, the servomechanism including means 40 and motor 49 adjusting the voltage supply to the resistance network until the resultant voltage across the input to amplifier 41 becomes zero. The voltage $$\frac{V_1}{2}\left(1+\frac{f}{K}+\frac{1}{K}\right)$$

may be derived from other circuits without departing from the spirit and scope of the invention.

Thus, although the circuit of Figure 2 enables the computer to function properly for practically all values of K and V, the circuit of Figure 3 enables the computer to be used also in special cases where the circuit of Figure 2 is somewhat insensitive. In some cases, where a special value of K is encountered for a particular component, the sensitivity-increasing circuit of Figure 4 may be substituted for the potentiometer 44 without making any other changes in the apparatus, thus enabling the particular equilibrium constant of the component of interest to be set with greater accuracy. This also applies to potentiometer 37 in case very small or very large values of Z should be encountered. It will be evident, therefore, that the circuit of Figure 4, which increases the spread of a potentiometer over a preselected portion of its range by a factor $f$, has utility independently of the computer circuits described herein. Furthermore, the computer circuits of Figures 1, 2, and 3 have obvious utility for the solution of problems other than those arising from consideration of vapor-liquid equilibria and it is intended that the broader claims shall be considered applicable to such other uses of the circuits.

While the invention has been described in connection with present preferred embodiments thereof, it is to be understood that this description is illustrative only and is not intended to limit the invention, the scope of which is defined by the appended claims.

I claim:

1. In a computer, in combination, a voltage source, means for picking off a preselected fraction of the voltage of said source to produce a reference voltage, an amplifier, a motor driven by the output of said amplifier, a first potentiometer connected directly across said voltage source, a second potentiometer, means for applying a variable portion of the voltage drop across said first potentiometer across said second potentiometer, said means being controlled by said motor, means for picking off a preselected fraction of the voltage drop across said second potentiometer, and means for comparing said preselected voltage drop with said reference voltage to produce a voltage difference for actuating said amplifier and said motor until said voltage difference is reduced to zero.

2. In a computer, in combination, a voltage source, means for picking off a preselected fraction of the voltage of said source to produce a reference voltage, an amplifier, a motor driven by the output of said amplifier, a first potentiometer connected directly across said voltage source, a low resistance potentiometer, means for applying a variable portion of the voltage drop across said first potentiometer across said low resistance potentiometer, said means being controlled by said motor, a high resistance potentiometer connected in cascade with said low resistance potentiometer, means for picking off a preselected fraction of the voltage drop across said high resistance potentiometer, and means for comparing said preselected fraction of voltage drop with said reference voltage to produce a voltage difference for actuating said amplifier and said motor until said voltage difference is reduced to zero.

3. In a computer, in combination, a voltage source means for picking off a preselected fraction of the voltage of said source to produce a reference voltage, an amplifier, a motor driven by the output of said amplifier, a first potentiometer connected directly across said voltage source, a low resistance potentiometer, means for applying a variable portion of the voltage drop across said first potentiometer across said low resistance potentiometer, said means being controlled by said motor, a high resistance potentiometer, a potential dividing network coupling said low resistance potentiometer to said high resistance potentiometer, means for picking off a preselected fraction of the voltage drop across said high resistance potentiometer, and means for comparing said preselected fraction of voltage drop with said reference voltage to produce a voltage difference for actuating said amplifier and said motor until said voltage difference is reduced to zero.

4. In a vapor-liquid equilibrium computer, in combination, a voltage source, a first potentiometer applied across said voltage source, means for picking off a fraction of the voltage drop across said first potentiometer equal to the product of the source voltage and mol fraction of a component in a liquid-vapor mixture, a low resistance potentiometer, a source of variable voltage applied across said low resistance potentiometer, means for picking off a fraction of the voltage drop across said low resistance potentiometer equal to the product of the equilibrium constant of said component and said variable voltage, a high resistance potentiometer connected in cascade with said low resistance potentiometer, means for picking off a fraction of the voltage drop across said high resistance potentiometer representing the total mol fraction of vapor in the mixture, servomechanism responsive to the difference in potential between the voltage picked off said first potentiometer and said high resistance potentiometer for adjusting said variable voltage until the voltage picked off said high resistance potentiometer is equal to the voltage picked off said first potentiometer, whereby said variable voltage equals the product of the source voltage and the mol fraction of said component in the liquid phase while the voltage picked off said low resistance potentiometer equals the product of the source voltage and the mol fraction of said components in the vapor phase.

5. In a computer, in combination, a voltage source, means for picking off a preselected portion of the voltage of said source to produce a reference voltage, a first potentiometer, means for applying a voltage from said source across said first potentiometer, servomechanism for adjusting the voltage applied across said first potentiometer, a second potentiometer connected in cascade with said first potentiometer, means for picking off a fraction of the voltage drop across said second potentiometer, means for comparing the voltage picked off said second potentiometer with said reference voltage to produce a voltage difference, and means for applying said voltage difference to said servomechanism, thereby to effect adjustment of the voltage applied across said first potentiometer until said voltage difference becomes zero.

6. The combination in accordance with claim 5 further comprising, in combination, a first resistor connected in series with said second potentiometer, and a second resistor connected in shunt with said second potentiometer, the ohmic value of said first resistor being $$\frac{f-1}{f} \cdot R$$

and the ohmic value of the second resistor being $$\frac{R}{f-1}$$

where $R$ is the total resistance of said second potentiometer and $f$ is the factor by which the spread of said second potentiometer is to be increased.

7. A computer comprising, in combination, a voltage source, a first potentiometer having the end terminals thereof connected across said voltage source, a second potentiometer having the end terminals thereof connected across said voltage source, a third potentiometer having one end terminal thereof connected to the contactor of said second potentiometer and the second end terminal thereof connected to a point of reference potential, a fourth potentiometer having one end terminal thereof connected to the contactor of said third potentiometer and having the second end terminal thereof connected to the contactor of said second potentiometer, means for comparing the potentials at the contactors of said first and fourth potentiometers, and means under control of said comparing means to vary the contactor setting of said second potentiometer until there is zero potential difference between the contactors of said first and fourth potentiometers.

8. The combination in accordance with claim 7 further comprising a pair of output terminals, and a reversing switch connecting said output terminals to the respective contactors of said second and third potentiometers.

9. The combination in accordance with claim 7 further comprising a voltage dividing network connected between said second end terminal of said fourth potentiometer and the contactor of said second potentiometer.

10. A computer comprising, in combination, a voltage source, a first potentiometer having the end terminals thereof connected across said voltage source, a second potentiometer having the end terminals thereof connected across said voltage source, a third potentiometer having one end terminal thereof connected to the contactor of said second potentiometer and the second end terminal thereof connected to a point of reference potential, a fourth potentiometer having one end terminal thereof connected to the contactor of said second potentiometer and having the second end terminal thereof connected to said point of reference potential, a first resistor having one end terminal thereof connected to the contactor of said second potentiometer, a second resistor having the first end terminal thereof connected to the second end terminal of said first resistor and having the second end terminal thereof connected to the contactor of said fourth potentiometer, a fifth potentiometer having one end terminal thereof connected to the contactor of said third potentiometer and having the second end terminal thereof connected to the second terminal of said first resistor, means for comparing the potentials at the contactors of said first and fifth potentiometers, and means under the control of said comparing means to vary the contactor setting of said second potentiometer until there is a zero potential difference between the contactors of said first and fifth potentiometers.

11. A computer comprising, in combination, a voltage source, means for establishing a reference voltage from said voltage source which is a predetermined fraction of the voltage of said source, a low resistance potentiometer, means for applying a first voltage from said source across the end terminals of said low resistance potentiometer, servomechanism for adjusting said first voltage applied across said low resistance potentiometer, a high resistance potentiometer connected in cascade with said low resistance potentiometer, means for comparing said reference voltage with the voltage between the contactor and one end terminal of said high resistance potentiometer to produce a voltage difference, and means for applying said voltage difference to said servomechanism whereby said servomechanism adjusts said first voltage applied across said low resistance potentiometer until said voltage difference becomes zero.

12. The combination in accordance with claim 11 wherein said means for applying said first voltage across said low resistance potentiometer comprises a voltage dividing network connected between said voltage source and said low resistance potentiometer.

13. The combination in accordance with claim 12 wherein said voltage dividing network comprises a first potentiometer having the end terminals thereof connected across said voltage source, a first resistor connected between the contactor of said first potentiometer and one end terminal of said high resistance potentiometer, a second potentiometer having the respective end terminals thereof connected to the contactor of said first potentiometer and to a point of reference potential, and a second resistor having the respective end terminals thereof connected to the contactor of said second potentiometer and the second-mentioned end terminal of said first resistor, said servomechanism being connected to the contactor of said first potentiometer for adjusting the position of the contactor of said first potentiometer.

14. The combination in accordance with claim 13 wherein the ohmic value of said first resistor is one-half the total ohmic value of said high resistance potentiometer and the ohmic value of said second resistor is one-third the total ohmic value of said high resistance potentiometer.

15. A vapor-liquid equilibrium computer comprising, in combination, a voltage source, a first potentiometer having the end terminals thereof connected across said voltage source, the voltage appearing between the contactor of said first potentiometer and one end terminal thereof being equal to the product of the source voltage and the mol fraction of a component in a vapor-liquid mixture, a low resistance potentiometer, a source of variable voltage applied across the end terminals of said low resistance potentiometer, said source of variable voltage being derived from said voltage source, the voltage appearing between the contactor and one end terminal of said low resistance potentiometer being equal to the product of the equilibrium constant of said component and said source of variable voltage, a high resistance potentiometer connected in cascade with said low resistance potentiometer, the voltage appearing between the contactor and one end terminal of said high resistance potentiometer representing the total mol fraction of vapor in the mixture, and means responsive to the potential difference between the contactors of said first potentiometer and said high resistance potentiometer for adjusting said source of variable voltage until the potential at the contactor of said high resistance potentiometer is equal to the potential at the contactor of said first potentiometer, the voltage applied across the end terminals of said low resistance potentiometer being equal to the product of said source voltage and the mol fraction of said component in the liquid phase while the voltage taken between the contactor and one end terminal of said low resistance potentiometer equals the product of said source voltage and the mol fraction of said component in the vapor phase.

References Cited in the file of this patent

UNITED STATES PATENTS

| | | |
|---|---|---|
| 1,858,267 | Eames | May 17, 1932 |
| 2,425,317 | Harris | Aug. 12, 1947 |
| 2,453,462 | Seller | Nov. 9, 1948 |
| 2,503,387 | Hartwig | Apr. 11, 1950 |
| 2,519,043 | Greenwood Jr., et al. | Aug. 15, 1950 |
| 2,519,667 | Koenig, Jr. | Aug. 22, 1950 |
| 2,525,967 | Smoot | Oct. 17, 1950 |
| 2,538,226 | Anderson et al. | Jan. 16, 1951 |
| 2,545,655 | Doyle et al. | Mar. 20, 1951 |
| 2,569,328 | Omberg | Sept. 25, 1951 |
| 2,613,237 | Starr | Oct. 7, 1952 |

FOREIGN PATENTS

| | | |
|---|---|---|
| 365,216 | Italy | Nov. 28, 1938 |
| 553,947 | Great Britain | June 11, 1943 |

OTHER REFERENCES

"Electronic Computers," Shannon, Electronics, August 1946 pp. 110–113 inclusive.

"Electrical Analogue Computing" Mynall Electronic Engineering, July 1947, pp. 214–217 inclusive.